United States Patent
Pitti

(10) Patent No.: US 11,109,184 B2
(45) Date of Patent: Aug. 31, 2021

(54) SYSTEM AND METHOD TO COMMUNICATE CUSTOMIZED NOTIFICATIONS BASED ON MICRO-LOCATIONS OF A CUSTOMER INSIDE A STORE

(71) Applicant: Bellboi, INC., Cincinatti, OH (US)

(72) Inventor: Abhishek Pitti, Telangana (IN)

( * ) Notice: Subject to any disclaimer, the term of this patent is extended or adjusted under 35 U.S.C. 154(b) by 0 days.

(21) Appl. No.: 16/784,424

(22) Filed: Feb. 7, 2020

(65) Prior Publication Data

US 2021/0185473 A1 Jun. 17, 2021

(51) Int. Cl.
| | |
|---|---|
| *H04W 24/00* | (2009.01) |
| *H04W 4/021* | (2018.01) |
| *H04W 4/029* | (2018.01) |
| *H04W 4/33* | (2018.01) |
| *H04W 4/23* | (2018.01) |
| *G06Q 30/02* | (2012.01) |
| *H04W 68/00* | (2009.01) |
| *H04W 4/60* | (2018.01) |

(52) U.S. Cl.
CPC ........ *H04W 4/021* (2013.01); *G06Q 30/0261* (2013.01); *G06Q 30/0267* (2013.01); *H04W 4/029* (2018.02); *H04W 4/23* (2018.02); *H04W 4/33* (2018.02); *H04W 4/60* (2018.02); *H04W 68/005* (2013.01)

(58) Field of Classification Search
None
See application file for complete search history.

(56) References Cited

U.S. PATENT DOCUMENTS

| | | | | |
|---|---|---|---|---|
| 2002/0016740 A1* | 2/2002 | Ogasawara | ........ | G06Q 30/0226 705/26.1 |
| 2008/0294487 A1* | 11/2008 | Nasser | ............... | G06Q 30/0203 705/7.32 |
| 2012/0188997 A1* | 7/2012 | Zakrzewski | .......... | H04J 3/0667 370/350 |
| 2014/0304075 A1* | 10/2014 | Dillingham | ........ | G06Q 30/0207 705/14.58 |
| 2015/0356667 A1* | 12/2015 | Poole | ................. | G06Q 30/0635 705/26.81 |
| 2017/0052835 A1* | 2/2017 | Cook | .................... | H04L 63/145 |

* cited by examiner

*Primary Examiner* — Jinsong Hu
*Assistant Examiner* — Alexander J Yi
(74) *Attorney, Agent, or Firm* — Leavitt Eldredge Law Firm

(57) ABSTRACT

The present invention is a system and method for communicating customized notifications based on micro-locations of a customer inside a store. The method includes detecting the presence of the customer by obtaining the identification code from the computing device of the customer through detectors placed at the physical location of a store; storing identification numbers corresponding to computing devices through a telecom server, the telecom server matches the identification code with the stored identification number to identify the customer; receiving an object identification code from the telecom server and transmitting a notification signal through a native server; receiving the notification signal to transmit a command signal to a wireless module of the computing device through development tools; forming a wireless network for detecting the computing device through wireless sensors. The native server communicates notifications to a native application integrated with the development tools, and messaging platform of the computing device.

10 Claims, 3 Drawing Sheets

SYSTEM AND METHOD TO COMMUNICATE CUSTOMIZED NOTIFICATIONS BASED ON MICRO-LOCATIONS OF A CUSTOMER INSIDE A STORE

BACKGROUND

1. Field of the Invention

The present invention relates to system and method for communicating customized notifications based on micro-locations of a customer inside a store, in particular to system and method to communicate customized notifications and predict shopping behavior of the customer based on micro-locations of a customer inside a store.

2. Description of Related Art

Currently, most of the purchase decisions are made by the customers in the store when they see the product physically. Store managers, brand owners, and marketers want to capitalize the opportunity by sending relevant communication and notifications to the potential customers to positively influence their purchase decision when they are present in store in real-time.

The existing systems and methods utilize Bluetooth® (BLE) technology to push notifications to the customers which are highly dependent on the customer's action where he/she has to switch on the Bluetooth of the phone and some particular software applications to be installed on the phone. Therefore there is a need for a secure, and efficient system and method to communicate customized notifications based on micro-locations of a customer inside a store. Further, there is a need for a system and method to predict customer's shopping behavior without forcing them to switch on wireless network or Bluetooth of their phone.

SUMMARY OF THE INVENTION

The present invention mainly solves the technical problems existing in the prior art. In response to these problems, the present invention provides a system and method for communicating customized notifications based on micro-locations of a customer inside a store.

An aspect of the present disclosure relates to a method for communicating customized notifications based on micro-locations of a customer inside a store. The method includes the step of detecting the presence of the customer by obtaining an identification code from the computing device of the customer through one or more detectors placed at the physical location of a store. The telecom server communicatively coupled with the detectors to match the identification code with a stored identification number to identify the customer. The method includes the step of storing a plurality of identification numbers corresponding to a plurality of computing devices associated with the customers through a telecom server. The method includes the step of receiving an object identification code from the telecom server on the identification of the customer and transmitting a notification signal to a native server. The method includes the step of receiving the notification signal from the native server to transmit a command signal to a wireless module of the computing device through a plurality of development tools. The plurality of development tools is installed within the computing device of the customer. The method includes the step of forming a wireless network for detecting the computing device when the computing device crosses a proximal threshold value through a plurality of wireless sensors placed at a plurality of locations inside the store. The wireless sensors obtain a device identification number, and one or more co-ordinates pertaining to the micro-locations of the customer from the computing device. The wireless sensors transmit the device identification number, a timestamp, the co-ordinates pertaining to the micro-locations, and a wireless sensor identification number to the native server. The native server processes the data received from the wireless sensors to communicate one or more notifications to at least one of a native application integrated with the plurality of development tools, and a messaging platform of the computing device. The method includes the step of predicting shopping behavior of the customer through a prediction module connected to the native server by mapping movement of the customer inside the store through the wireless network formed by the wireless sensor.

In an aspect, the co-ordinates pertaining to the micro-locations is representative of the presence of the customer on a specific aisle of the store.

In an aspect, the notifications include but not limited to push notifications or push messages related to a promotional offer or discounts related to items (products) placed near the co-ordinates pertaining to the micro-locations.

In an aspect, the development tools are integrated with one or more software application modules.

In an aspect, the development tools retrieve device identification number to allow one or more software application modules to identify the customer.

In an aspect, the detector transmits an activation signal to the development tools to activate the wireless module of the computing device through at least one of the native applications and the software application modules.

In an aspect, the native server maps the device identification number, timestamp, co-ordinates pertaining to the micro-locations, the wireless sensor identification number, and information related to locations of the items placed on the aisle (which aisle has what items) to retrieve the aisle level information of the customer to determine the micro-locations (which isle the customer is in) of the customer.

In an aspect, the detector includes but not limited to a radio frequency (RF) sensor.

In an aspect, the wireless sensors include but not limited to Bluetooth sensors.

In an aspect, the plurality of development tools can partially identify the device identification number of the computing device of the customer.

Another aspect of the present invention relates to a system to communicate customized notifications based on micro-locations of a customer inside a store. The system includes a telecom server, one or more detectors, a native server, a plurality of development tools, a plurality of wireless sensors, and a prediction module. The telecom server stores a plurality of identification numbers corresponding to a plurality of computing devices associated with the customers. The detectors are placed at a physical location of a store to detect the presence of the customer by obtaining the identification code from the computing device of the customer. The telecom server communicatively coupled with the detectors to match the identification code with the stored identification number to identify the customer. The native server receives an object identification code from the telecom server on the identification of the customer and transmits a notification signal. The plurality of development tools receives the notification signal from the native server to transmit a command signal (beacon) to a wireless module of the computing device. The plurality of development tools is installed within the computing device of the customer. The wireless sensors are placed at a plurality of locations inside the store to form a wireless network to detect the computing device when the computing device crosses a proximal threshold value. The wireless sensors obtain a device identification number, and one or more co-ordinates pertaining to the micro-locations of the customer from the computing device. The wireless sensors transmit the device identification number, a timestamp, the co-ordinates pertaining to the micro-locations, and a wireless sensor identification number to the native server. The native server processes the data received from the wireless sensors to communicate one or more notifications to at least one of a native application integrated with the plurality of development tools, and a messaging platform of the computing device. The prediction module connected to the native server to predict shopping behavior of the customer by mapping the movement of the customer inside the store through the wireless network formed by the wireless sensor.

Accordingly, one advantage of the present invention is that it leverages micro-locations of the computing devices of the customers to provide an improved and customized shopping experience.

Accordingly, one advantage of the present invention is that it can retrieve the aisle level information of the customer to accurately determine the micro-locations of the customer.

Accordingly, one advantage of the present invention is that it provides section specific communications/offers to the customer to increase the conversion.

Accordingly, one advantage of the present invention is that it analyses the time spent by the customer inside the store in a particular section using machine learning and specific algorithms to understand the shopping behavior of the customer.

Accordingly, one advantage of the present invention is that it integrates RF sensor, Bluetooth mesh network, and SDK that will facilitate the communication with customers at micro-locations inside the store.

Accordingly, one advantage of the present invention is that it improves customer's in-store experience and also increases footfall ratio and facilitates quick product search and increases conversion rates while generating a powerful shopping environment that can help enhance product offerings and store layouts.

Other features of embodiments of the present invention will be apparent from accompanying drawings and from the detailed description that follows.

Yet other objects and advantages of the present invention will become readily apparent to those skilled in the art following the detailed description, wherein the preferred embodiments of the invention are shown and described, simply by way of illustration of the best mode contemplated herein for carrying out the invention. As we realized, the invention is capable of other and different embodiments, and its several details are capable of modifications in various obvious respects, all without departing from the invention. Accordingly, the drawings and description thereof are to be regarded as illustrative in nature, and not as restrictive.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
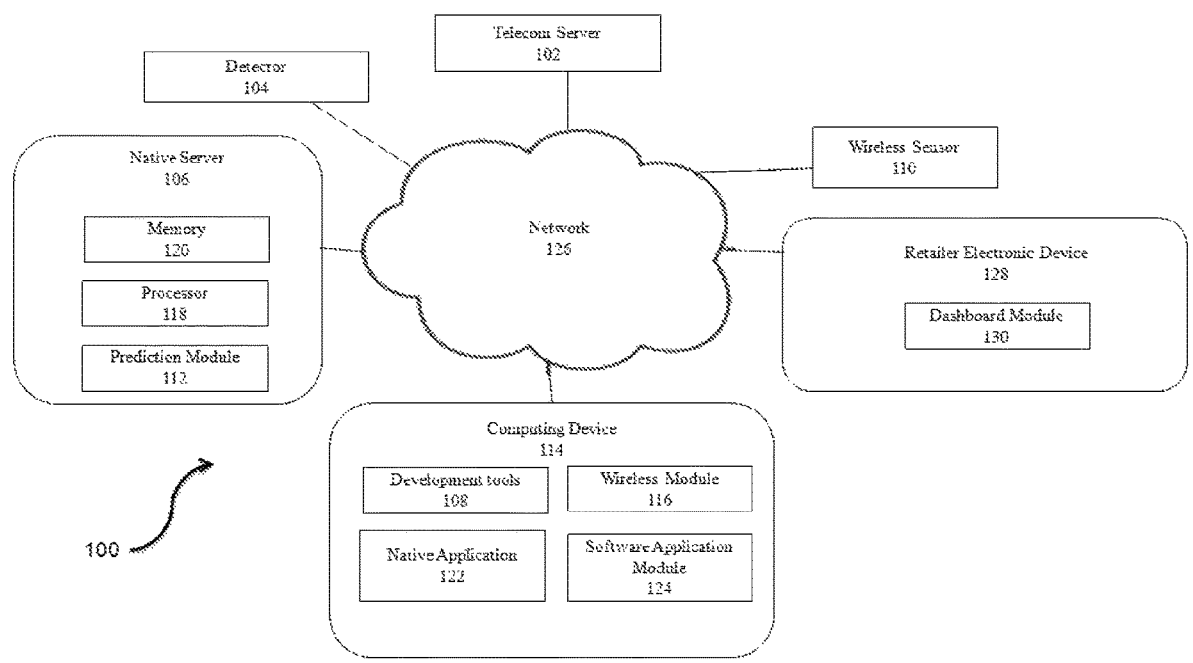
FIG. 1 illustrates a network implementation of the present system to communicate customized notifications based on micro-locations of a customer inside a store over a network, in accordance with an embodiment of the present subject matter.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Methods of the present invention may be implemented by performing or completing manually, automatically, or a combination thereof, selected steps or tasks. The term "method" refers to manners, means, techniques and procedures for accomplishing a given task including, but not limited to, those manners, means, techniques, and procedures either known to, or readily developed from known manners, means, techniques and procedures by practitioners of the art to which the invention belongs. The descriptions, examples, methods, and materials presented in the claims and the specification are not to be construed as limiting but rather as illustrative only. Those skilled in the art will envision many other possible variations within the scope of the technology described herein.

FIG. 1 illustrates a network implementation of the present system 100 to communicate customized notifications based on micro-locations of a customer inside a store over a network, in accordance with an embodiment of the present subject matter. The system 100 includes a telecom server 102, one or more detectors 104, a native server 106, a plurality of development tools 108, a plurality of wireless sensors 110, and a prediction module 112.

The network 126 may be a wired or a wireless network, and the examples may include but are not limited to the Internet, Wireless Local Area Network (WLAN), Wi-Fi, Long Term Evolution (LTE), Worldwide Interoperability for Microwave Access (WiMAX), General Packet Radio Service (GPRS), Bluetooth (BT) communication protocols, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), Z-Wave, Thread, 5G, USB, serial, RS232, NFC, RFID, WAN, and/or IEEE 802.11, 802.16, 2G, 3G, 4G cellular communication protocols.

The telecom server 102 stores a plurality of identification number (phone number or Mobile Station International Subscriber Directory Number (MSISDN)) corresponding to a plurality of computing devices associated with the customers. Examples of the computing device 114 include but not limited to a laptop, a desktop, a smartphone, a smart device, a smartwatch, a phablet, and a tablet.

The detectors 104 are placed at a physical location of a store to detect the presence of the customer by obtaining the identification code such as International Mobile Equipment Identity (IMEI) or IMSI from the computing device of the customer. Typically, IMEI is a number to identify 3GPP and iDEN mobile phones, as well as some satellite phones. The telecom server 102 communicatively coupled with the detectors 104 to match the identification code with the stored identification number to identify the customer. In an embodiment, the detector 104 transmits an activation signal to the development tools 108 to activate the wireless module 116 of the computing device 114 through at least one of the native application 122 and the software application modules 124. The native application 122 is a mobile app operable to perform various functions (such as viewing offers, products in the store) related to the present system 100. In an embodiment, the software application modules 124 is related to third-party applications (mobile apps) installed in the customer's computing device 114. In an embodiment, the detector 104 includes but not limited to a radio frequency (RF) sensor.

The native server 106 receives an object identification code from the telecom server 102 on the identification of the customer and transmit a notification signal. Object identification code or object ID is an encrypted form of the identification code. The identification code of the computing device 114 is pushed to the telecom server 102 from detector 104 where it is encrypted in the form of the object ID. If the customer whose computing device id is identified are consented, the telecom server 102 sends its corresponding identification number (phone number or Mobile Station International Subscriber Directory Number (MSISDN)) to the native server 106 through which the corresponding promotional offer message is pushed to the customer. If the customer is not consented, then telecom server 102 does not send the phone number to the native server 106. The telecom server 102 instead just sends the object ID only to the native server 106 where the corresponding offer message is mapped and pushed back to a telecom's SMS portal from where the promotional offer message is directly pushed to the customer by telecom server 102 instead of sharing the non-consented customer's phone number with the native server 106.

The plurality of development tools 108 receives the notification signal from the native server 106 to transmit a command signal (beacon) to a wireless module 116 such as Bluetooth™ or WiFi of the computing device 114. The plurality of development tools 108 is installed within the computing device of the customer. Examples of the development tools 108 include but not limited to software development kit (SDK or devkit). In an embodiment, the development tools 108 are integrated with one or more software application modules (third party applications). In an embodiment, the development tools 108 retrieve identification number to allow one or more software application modules (third party applications) to identify the customer. Examples of the device identification number include but is not limited to a service set identifier (SSID) number, media access control address (MAC address), etc.

The development tools 108 are a set of software development tools that allows the creation of applications for a certain software package, software framework, hardware platform, computer system, video game console, operating system, or similar development platform. In an embodiment, the plurality of development tools 108 can partially identify the device identification (SSID) number of the computing device of the customer.

The wireless sensors 110 are placed at a plurality of locations inside the store to form a wireless network to detect the computing device 114 when the computing device 114 crosses a proximal threshold value. Examples of the wireless sensors 110 include but not limited to Bluetooth sensors. The wireless sensors 110 obtain a device identification number, and one or more co-ordinates pertaining to the micro-locations of the customer from the computing device 114. In an embodiment, the co-ordinates pertaining to the micro-locations is representative of the presence of the customer on a specific aisle of the store. The wireless sensors 110 transmit the device identification number, a timestamp, the co-ordinates pertaining to the micro-locations, and a wireless sensor identification number to the native server 106.

The native server 106 utilizes a processor 118 to process the data received from the wireless sensors 110 to communicate one or more notifications to at least one of a native application such as a software application (implementable to operating system such as Android or ios or windows) integrated with the plurality of development tools, and a messaging platform of the computing device 114. In an embodiment, the notifications include but not limited to push notifications related to a promotional offer or discounts related to items (products) placed near the co-ordinates pertaining to the micro-locations.

In an embodiment, the native server 106 maps the device identification number, timestamp, co-ordinates pertaining to the micro-locations, the wireless sensor identification number, and information related to locations of the items placed on the aisle (which aisle has what items) to retrieve the aisle level information of the customer to determine the micro-locations (which isle the customer is in) of the customer.

The native server 106 may include a memory 120 to store the processed data, customized notifications, and micro-locations. Processor 118 may include at least one data processor for executing program components for executing user- or system-generated requests. Processor 118 may include specialized processing units such as integrated system (bus) controllers, memory management control units, floating point units, graphics processing units, digital signal processing units, etc.

Processor 118 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 118 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 118 may be disposed of in communication with one or more input/output (I/O) devices via an I/O interface. I/O interface may employ communication protocols/methods such as, without limitation, audio, analog, digital, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

The memory 120 may include any computer-readable medium known in the art including, for example, volatile memory, such as static random access memory (SRAM) and dynamic random access memory (DRAM), 15 and/or non-volatile memory, such as read-only memory (ROM), erasable programmable ROM, flash memories, hard disks, optical disks, and magnetic tapes. The processor 118 may be implemented as one or more microprocessors, microcomputers, microcontrollers, digital signal processors, central processing units, state machines, logic circuitries, and/or any devices that manipulate signals based on operational instructions. Among other capabilities, at least one processor 118 is configured to fetch and execute computer-readable instructions stored in the memory 120. The prediction module 112 connected to the native server 106 to predict shopping behavior of the customer by mapping the movement of the customer inside the store through a wireless network (shown in FIG. 2) such as Bluetooth mesh network formed by the wireless sensors 110. The prediction module 112 may utilize one or more machine learning (ML) algorithms to predict the customer's shopping behavior and may direct the native server 106 to transmit the customized offers to the customer to increase the conversion rate.

In an embodiment, the present system 100 includes a retailer electronic device 128 that facilitates a retailer or store manager to monitor the movement of the customer insider the store and track the shopping behavior through a dashboard module 130 integrated within the retailer electronic device 128. Examples of the retailer electronic device 128 include but not limited to a computer, a smartphone, a kiosk, a laptop, etc. The dashboard module 130 is a user interface (UI or GUI) that represents a map of the store with marking of the wireless sensors 110. In an embodiment, the dashboard module 130 depicts customer traffic in different aisles of the store. Further, the dashboard module 130 reflects the conversions and actions taken on the notifications or communications sent at aisle level to computing devices 114 of the customers.

Figure 2:
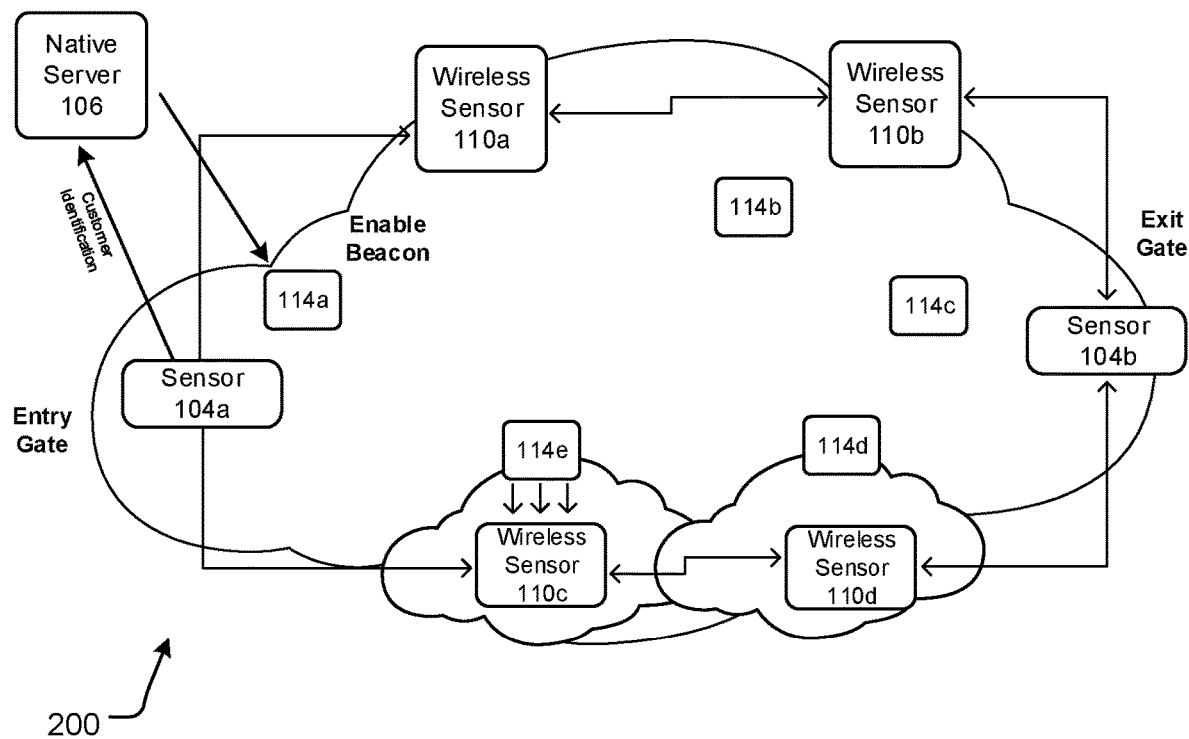
FIG. 2 illustrates a perspective diagram of the wireless network formed by the wireless sensor, in accordance with an embodiment of the present subject matter.

FIG. 2 illustrates a perspective diagram 200 of the wireless network formed by the wireless sensor 110, in accordance with an embodiment of the present subject matter. FIG. 2 is explained in conjunction with FIG. 1. The present system may utilize Bluetooth sensors as wireless sensors 110a, 110b, 110c, and 110d. The Bluetooth sensors 110a, 110b, 110c, and 110d maps the movement of the customer inside the store through a wireless network such as Bluetooth mesh network formed by the wireless sensors 110. The Bluetooth mesh network of the present system 100 enables many-to-many (m:m) device communications and is optimized for creating large-scale device networks. The Bluetooth mesh network of the present system 100 operates on Bluetooth Low Energy (BLE) and can be operable with various core specification versions such as 4.0 and higher. When a customer with the computing devices (114a, 114b, 114c, and 114d) comes in the vicinity of the detector 104a (installed at the entry gate of the store), and 104b (installed at the exit gate of the store), the phone's identity (IMEI/IMSI) of the customer is captured and the data is pushed to the telecom server 102. The object id is created for the identification data. If the customer has consented, it's object id and phone number is pushed to the native server 106. If not consented only object id will be sent to the native server 106.

In an embodiment, the detector 104 activates the SDK integrated into the third-party apps to switch on the Bluetooth of the customers computing device 104. The SDK transmits the command signal or beacon to the Bluetooth of the computing device. The third-party apps may perform customer authentication through phone number which is fetched by the SDK. The SDK may identify the customers Bluetooth SSID. When the customer comes in the vicinity of the wireless sensors 110a, 110b, 110c, and 110d placed in a specific section of the store, the wireless sensors 110a, 110b, 110c, and 110d will recognize the customers device identification number. This information will be pushed to the native server 106 along with the time stamp and Bluetooth sensor ID. By analyzing the information, the customers location inside the store is found and location/section specific promotions will be pushed to the customer. The native server 106 determines the aisle level information by mapping the sensor ID, Bluetooth sensor id and physical location context (already obtained from third-party—vendors, customer or any related party to the location of the detectors.

When the customer moves from one wireless sensor 110 to another, the customer's information is passed from one wireless sensor 110 to another in the Bluetooth mesh network. This information will help analyze the customer's movement inside the store and can help predict the shopping behavior of the customer using specific algorithms and the machine learning technique.

Figure 3:
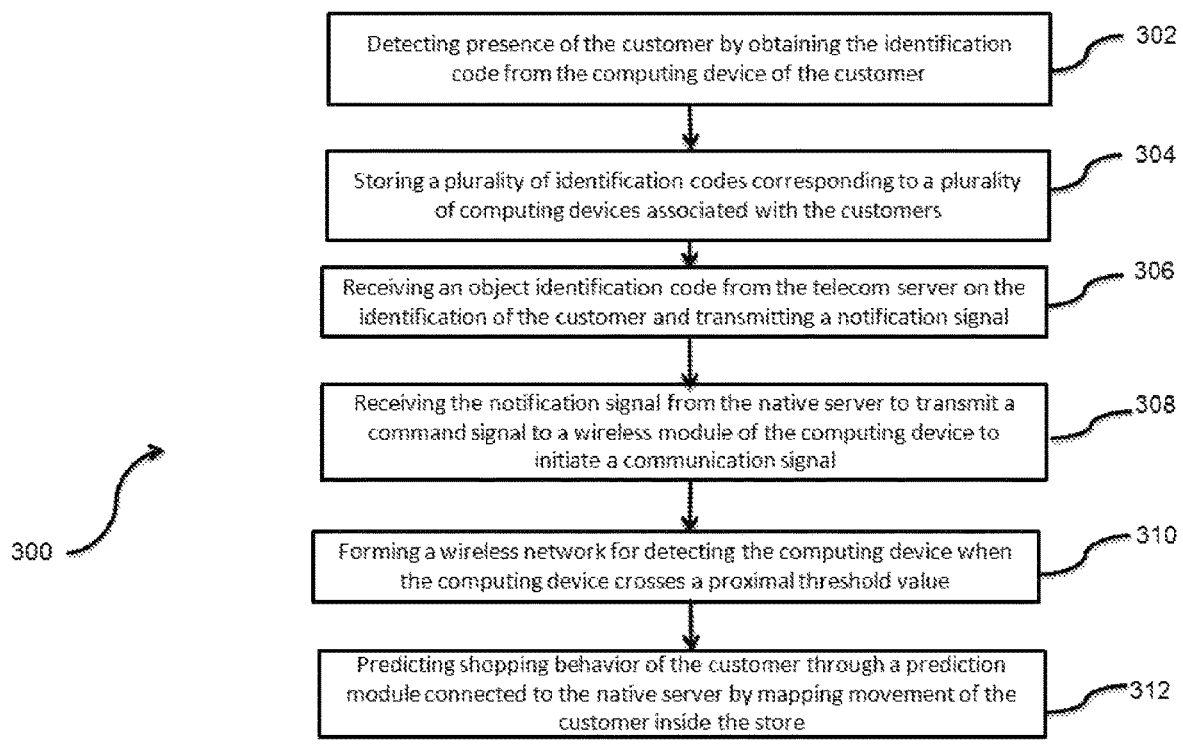
FIG. 3 illustrates a flowchart of the method for communicating customized notifications based on micro-locations of a customer inside a store over a network, in accordance with an embodiment of the present subject matter.

FIG. 3 illustrates a flowchart 300 of the method for communicating customized notifications based on micro-locations of a customer inside a store over a network, in accordance with an embodiment of the present subject matter. The method includes the step 302 of detecting the presence of the customer by obtaining the identification code from the computing device of the customer through one or more sensors placed at a physical location of a store. The method includes step 304 of storing a plurality of identification numbers corresponding to a plurality of computing devices associated with the customers through a telecom server. The telecom server communicatively coupled with the sensors to match the identification code with the stored identification number to identify the customer. The method includes the step 306 of receiving an object identification code from the telecom server on the identification of the customer and transmitting a notification signal through a native server. In an embodiment, the detector transmits an activation signal to the development tools to activate the wireless module of the computing device through at least one of the native applications and the software application modules.

The method includes the step 308 of receiving the notification signal from the native server to transmit a command signal or a beacon to a wireless module of the computing device through a plurality of development tools. The plurality of development tools is installed within the computing device of the customer. In an embodiment, the development tools are integrated with one or more software application modules. In an embodiment, the development tools retrieve device identification number to allow one or more software application modules to identify the customer. In an embodiment, the plurality of development tools can partially identify the device identification number of the computing device of the customer.

In an embodiment, the co-ordinates pertaining to the micro-locations is representative of the presence of the customer on a specific aisle of the store. The method includes the step 310 of forming a wireless network for detecting the computing device when the computing device crosses a proximal threshold value through a plurality of wireless sensors (Bluetooth sensors) placed at a plurality of locations inside the store. The wireless sensors obtain a device identification number, and one or more co-ordinates pertaining to the micro-locations of the customer from the computing device. The wireless sensors transmit the device identification number, the timestamp, the co-ordinates pertaining to the micro-locations, and the wireless sensor identification number to the native server. The native server processes the data received from the wireless sensors to communicate one or more notifications to at least one of a native application integrated with the plurality of development tools, and a messaging platform of the computing device. In an embodiment, the notifications include but not limited to push notifications related to a promotional offer or discounts related to items (products) placed near the co-ordinates pertaining to the micro-locations.

The method includes the step 312 of predicting shopping behavior of the customer through a prediction module connected to the native server by mapping movement of the customer inside the store through the wireless network formed by the wireless sensor. In an embodiment, the native server maps the device identification number, timestamp, co-ordinates pertaining to the micro-locations, the wireless sensor identification number, and information related to locations of the items placed on the aisle (which aisle has what items) to retrieve the aisle level information of the customer to determine the micro-locations (which isle the customer is in) of the customer.

In an exemplary operation, the customer walks inside the store, and IMEI/IMSI related to the computing device of the customer is identified by the RF sensor. Then the native server receives the object ID from telecom server on customer identification. The native server notifies the SDK in the customer's phone to switch on Bluetooth on the customer's phone. The SDK enables the Bluetooth of the phone. The phone is identified by the Bluetooth sensor installed in the store. Thereafter either SDK or the sensor notifies the customer presence on the aisle to the native server. Finally, the native server sends the notifications or relevant communications to the customer as in-app notification and SMS. Thus, the present system and method leverage micro-locations of the computing devices of the customers to provide an improved and customized shopping experience. The present system and method integrate RF sensor, Bluetooth mesh network, and SDK to facilitate the communication with customers at micro-locations inside the store. The present system and method also improve the customer's in-store experience and increases footfall ratio and facilitates quick product search and increases conversion rates while generating a powerful shopping environment that can help enhance product offerings and store layouts.

The embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A system to communicate customized notifications based on micro-locations of a customer inside a store, the system comprising:
   a telecom server to store a plurality of identification codes comprising a plurality of International Mobile Equipment Identity (IMEI) numbers and a plurality of International Mobile Subscriber Identity (IMSI) numbers corresponding to a plurality of computing devices associated with customers inside the store;
   one or more detectors placed at one or more physical locations of the store to detect presence of the customer by obtaining one or more of the IMEI number and the IMSI number from the computing device of the customer, wherein the telecom server communicatively coupled with the detectors to match the one or more of the IMEI number and the IMSI number with the one or more of the IMEI number and the IMSI number stored in the telecom server to identify the customer;
   a native server to receive an object identification code from the telecom server on the identification of the customer and transmit a notification signal;
   a plurality of development tools to receive the notification signal from the native server to transmit a command signal to a wireless module of the computing device, wherein the plurality of development tools are installed within the computing device of the customer;
   a plurality of wireless sensors placed at a plurality of locations inside the store to form a wireless network to detect the computing device when the computing device crosses a proximal threshold value, wherein the wireless sensors obtain a service set identifier (SSID) number, a media access control address (MAC address), and one or more co-ordinates pertaining to the micro-locations of the customer, from the computing device, wherein the wireless sensors transmit the service set identifier (SSID) number, the media access control address (MAC address), a timestamp, the co-ordinates pertaining to the micro-locations, and a wireless sensor identification number to the native server, wherein the native server processes the data received from the wireless sensors to communicate one or more notifications to at least one of a native application integrated with the plurality of development tools and a messaging platform of the computing device;

a prediction module connected to the native server to predict shopping behavior of the customer by mapping movement of the customer inside the store through the wireless network formed by the wireless sensors;

a retailer electronic device to facilitate a retailer to monitor movement of the customer inside the store; and a dashboard module integrated within the retailer electronic device to track shopping behavior of the customer, wherein the dashboard module is a user interface (UI) that represents a map of the store with markings of the wireless sensors.

2. The system according to claim 1, wherein the co-ordinates pertaining to the micro-locations is representative of a presence of the customer on a specific aisle of the store.

3. The system according to claim 1, wherein the notifications comprise a promotional offer related to one or more items placed near the co-ordinates pertaining to the micro-locations.

4. The system according to claim 1, wherein the development tools are integrated with one or more software application modules, wherein, the development tools retrieve the device identification number to allow one or more software application modules to identify the customer.

5. The system according to claim 1, wherein the detector transmits an activation signal to the development tools to activate the wireless module of the computing device through at least one of the native application and software application modules.

6. A method for communicating customized notifications based on micro-locations of a customer inside a store, the method comprising steps of:

storing a plurality of identification numbers comprising a plurality of International Mobile Equipment Identity (IMEI) numbers and a plurality of International Mobile Subscriber Identity (IMSI) numbers corresponding to a plurality of computing devices associated with customers inside the store, in a telecom server;

detecting presence of the customer by obtaining one or more of the IMEI number and the IMSI number from the computing device of the customer through one or more detectors placed at a physical location of a store, wherein the telecom server is communicatively coupled with the detectors to match the one or more of the IMEI number and the IMSI number with the one or more of the IMEI number and the IMSI number stored in the telecom server to identify the customer;

receiving an object identification code from the telecom server on the identification of the customer and transmitting a notification signal through a native server;

receiving the notification signal from the native server to transmit a command signal to a wireless module of the computing device through a plurality of development tools, wherein the plurality of development tools are installed within the computing device of the customer;

forming a wireless network for detecting the computing device when the computing device crosses a proximal threshold value through a plurality of wireless sensors placed at a plurality of locations inside the store, wherein the wireless sensors obtain a service set identifier (SSID) number, a media access control address (MAC address), and one or more co-ordinates pertaining to the micro-locations of the customer, from the computing device, wherein the wireless sensors transmit the service set identifier (SSID) number, the media access control address (MAC address), a timestamp, the co-ordinates pertaining to the micro-locations, and a wireless sensor identification number to the native server, wherein the native server processes the data received from the wireless sensors to communicate one or more notifications to at least one of a native application integrated with the plurality of development tools and a messaging platform of the computing device;

predicting shopping behavior of the customer through a prediction module connected to the native server by mapping movement of the customer inside the store through the wireless network formed by the wireless sensor;

facilitating a retailer to monitor movement of the customer inside the store using a retailer electronic device; and a dashboard module integrated within the retailer electronic device to track shopping behavior of the customer, wherein the dashboard module is a user interface (UI) that represents a map of the store with markings of the wireless sensors.

7. The method according to claim 6, wherein the co-ordinates pertaining to the micro-locations is representative of a presence of the customer on a specific aisle of the store.

8. The method according to claim 6, wherein the notifications comprise a promotional offer related to one or more items placed near the co-ordinates pertaining to the micro-locations.

9. The method according to claim 6, wherein the development tools are integrated with one or more software application modules, wherein the development tools retrieve the device identification number to allow one or more software application modules to identify the customer.

10. The method according to claim 6, wherein the detector transmits an activation signal to the development tools to activate the wireless module of the computing device through at least one of the native application and software application modules.

* * * * *